Dec. 13, 1938.  W. D. L. THEED  2,140,095

CONTROL OF WING FLAPS ON AIRCRAFT

Filed Nov. 27, 1936

INVENTOR
W. D. L. THEED.
BY
Blair Kilgour
ATTORNEY

UNITED STATES PATENT OFFICE 2,140,095

CONTROL OF WING FLAPS ON AIRCRAFT

William Denis Learoyd Theed, London, England, assignor to Sir George Godfrey and Partners Limited, London, England, a company of Great Britain Application November 27, 1936, Serial No. 113,079
In Great Britain December 5, 1935

1 Claim. (Cl. 244—42)

This invention relates to the control of the wing flaps on aircraft and has for its object to provide control apparatus which, while being simple in construction, light and compact, will obviate or reduce the effort which the pilot would otherwise be called upon to exert when moving the flaps into the operative position.

According to the present invention the wing flap or flaps are actuated by power derived from the suction of the engine or power unit.

The apparatus preferably comprises a servo cylinder containing a piston operatively connected to the flap or flaps, and a control valve whereby communication can be established between the servo cylinder and the induction system of the engine or power unit. Means may also be provided whereby the flaps are normally held inoperative or moved into their inoperative position by power derived from the induction of the engine or power unit.

The servomotor may comprise a cylinder containing a double-acting piston connected to the flap or flaps, the said valve controlling communication between the induction system of the engine or power unit and the servo cylinder on opposite sides of the piston so that the flaps are moved by power derived from the suction of the engine or power unit, not only from the inoperative position towards the fully operative position but also from an operative position towards the inoperative position.

Figure 1:
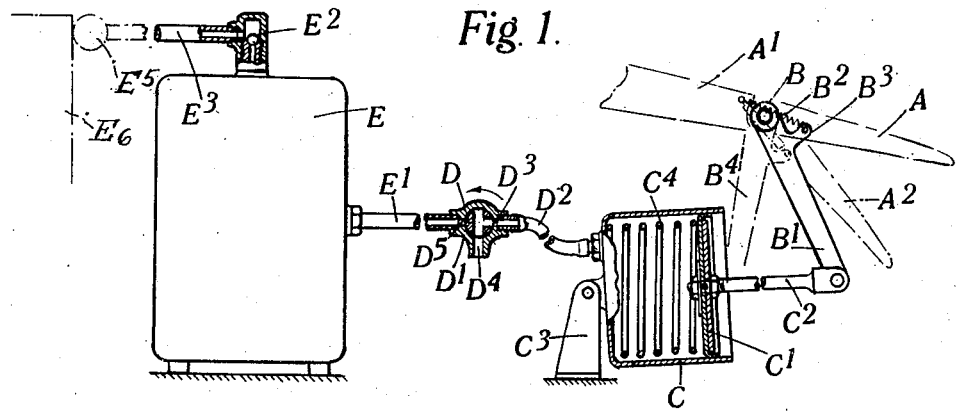
Figure 2:
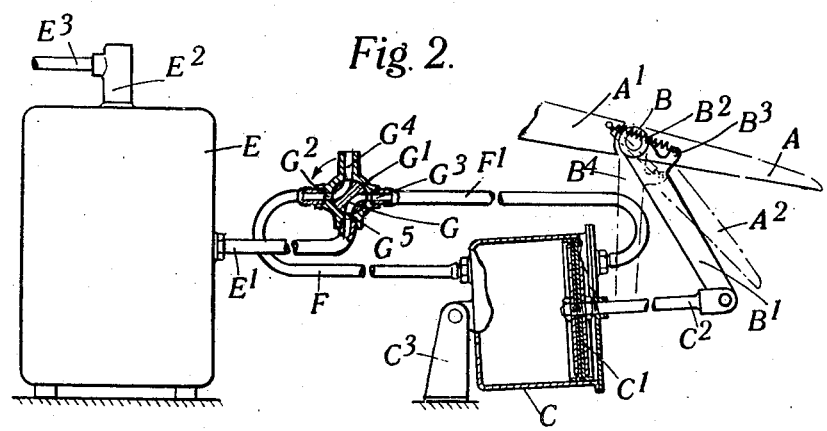
Figure 3:
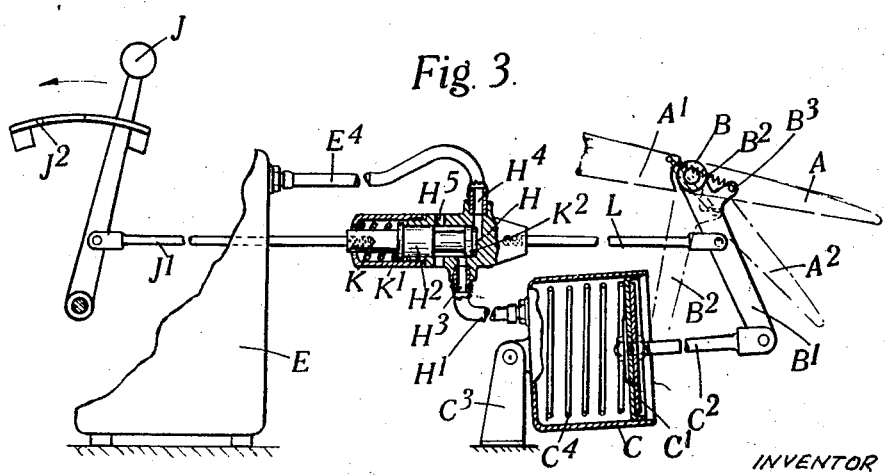

The invention may be carried into practice in various ways but three constructions, each embodying the invention, are shown diagrammatically and by way of example in Figures 1, 2 and 3 respectively of the accompanying drawing.

In the construction shown in Figure 1 each wing flap A, hinged at the trailing edge of the wing $A^1$, is connected to a torque tube B having a crank $B^1$ secured thereto. The crank $B^1$ is connected to the rod $C^2$ of a single acting piston $C^1$ arranged within a servo cylinder C which is mounted to pivot on a fixed bracket $C^3$. The piston $C^1$ is biased by a compression spring $C^4$ which tends to maintain the crank $B^1$ in the position shown in full lines and corresponding to the raised or inoperative position of the flap A.

A flexible tube $D^2$ leads from the cylinder C to a casing $D^1$ of a three-way rotary valve D which is under the control of the pilot, this valve being preferably loaded by a spring (not shown) which tends to retain the valve in the position shown. The valve casing $D^1$ has three ports, namely a port $D^3$ leading to the flexible tube $D^2$, a port $D^4$ open to the atmosphere and a port $D^5$ leading through a pipe $E^1$ to a suction reservoir E. The reservoir has a non-return valve $E^2$ controlling a port through which air can be drawn from the reservoir through a pipe $E^3$ communicating with the induction pipe $E^5$ of the engine indicated at $E^6$.

When the valve D is in the position shown the servo cylinder C communicates with the atmosphere through the ports $D^3$ and $D^4$ so that the spring $C^4$ holds the piston $C^1$ and crank $B^1$ in the normal position, that is to say with the flap A in its raised or inoperative position. The spring $C^4$ is now assisted by a tension spring $B^2$ which is anchored at one end to a fixed part and is secured at the other end to an arm $B^3$ carried by the crank $B^1$, the axis of the spring $B^2$ lying above the axis of the torque tube B. When the pilot wishes to render the flaps operative he turns the valve D in the direction shown by the arrow, thereby cutting off communication between the ports $D^4$ and $D^3$ and establishing communication between the ports $D^3$ and $D^5$. The suction thus produced in the cylinder C, due to the depression in the reservoir E, moves the piston $C^1$ against the action of the spring $C^4$ and turns the crank $B^1$ towards the position indicated at $B^4$. Since the axis of the spring $B^2$ normally lies above but adjacent to the axis of the torque tube B the spring $B^2$ will not be appreciably extended during the initial downward movement of the flap A so that though the spring will normally assist in maintaining the flap A in its raised or inoperative position it will not materially add to the load on the servo-piston C when this turns the flap A towards the fully operative position indicated at $A^2$.

By suitable manipulation of the valve D the degree of the depression produced within the cylinder can be modified to bring the piston $C^1$ and therefore the flap A to the desired position, the valve D being then retained in an intermediate position wherein all the ports $D^3$, $D^4$ and $D^5$ are closed. The spring $C^4$ and the depression within the cylinder C then balance each other so as to tend to retain the flap A in the desired position. On release of the valve D the ports $D^3$ and $D^4$ are again brought into communication so that the piston $C^1$, crank $B^1$ and flap A are restored, by the spring $C^4$, to their normal positions.

Instead of or in addition to the spring $C^4$ an auxiliary servomotor may be provided comprising a piston operatively connected to the flap, say through the crank $B^1$, and arranged in a cylinder which is brought into communication with the reservoir E when the valve F is in the position shown in the drawing, so that the flap will be held in its inoperative position by the auxiliary servomotor, whose cylinder is brought into communication with the atmosphere when the valve D is turned to bring the ports $D^3$ and $D^5$ into communication.

Figure 2 illustrates another arrangement in which the piston $C^1$ is double acting within the cylinder C opposite ends of which communicate through flexible pipes F and $F^1$ with the casing $G^1$ of a four-way rotary valve G. The valve casing has four ports, namely the ports $G^2$ and $G^3$ communicating with the pipes F and $F^1$, a port $G^4$ open to the atmosphere and a port $G^5$ communicating through a pipe $E^1$ with a suction reservoir E as described with reference to Figure 1.

Under normal conditions the valve G is held in the position shown, say, by a control spring, so that the cylinder C on the left of the piston $C^1$ communicates with the atmosphere through the ports $G^2$ and $G^4$, the part of the cylinder C on the right of the piston $C^1$ communicating through the ports $G^3$ and $G^5$ with the suction reservoir E. The crank $B^1$ is thus held in its raised or inoperative position by the suction derived from the engine.

When the pilot wishes to render the flaps operative he turns the valve G so as to cut off communication between the ports $G^2$ and $G^4$ and between the ports $G^3$ and $G^5$, but to establish communication between the ports $G^2$, $G^5$ and between the ports $G^3$ and $G^4$. The part of the cylinder C to the left of the piston $C^1$ is thus brought into communication with the suction reservoir E whilst the part of the cylinder C to the right of the piston $C^1$ is brought into communication with the atmosphere. The piston $C^1$ is therefore moved to the left so as to move the flap A from the inoperative position towards the operative position indicated at $A^2$.

By suitable manipulation of the valve G the degree of suction on the opposite sides of the piston $C^1$ can be determined so as to bring the piston $C^1$ into, and retain it in, the desired position. The flap A can thus be brought to any position between the fully raised or inoperative position and the fully lowered or operative position $A^2$.

Yet a further construction embodying the invention is shown in Figure 3 in which the servo cylinder C, similar to that described with reference to Figure 1, communicates through a flexible pipe $H^1$ with the casing H of a piston valve $H^2$. The casing H has two ports $H^3$ and $H^4$ communicating respectively with the flexible pipe $H^1$ and a flexible pipe $E^1$ leading to a suction reservoir E similar to that described above. The casing H is also furnished with ports $H^5$ open to the atmosphere.

A control lever J, accessible to the pilot, is connected through a rod $J^1$ to the piston valve $H^2$. A spring K bears at one end against the casing H and at the other end against a flange $K^1$ formed on the valve $H^2$, the spring K thus urging the valve $H^2$ to the right as shown in the drawing so as to tend to maintain the conical surface $K^2$ of the valve on a cooperating seating surface formed within the casing H. With the lever J in the normal position shown the valve $H^2$ is held on its seating surface so that the port $H^4$ is closed whereas the cylinder C communicates through the ports $H^3$ and $H^5$ with the atmosphere. The spring $C^4$, assisted by the tension spring $B^2$, now holds the flap A in the raised or inoperative position as shown.

If the flap A is to be rendered operative the pilot moves the lever J in the direction of the arrow so that the conical surface $K^2$ of the valve $H^2$ is moved off its seating surface and communication between the ports $H^3$ and $H^5$ is cut off prior to communication being established between the ports $H^3$ and $H^4$. The resulting suction in the cylinder C moves the piston $C^1$ to the left as viewed in the drawing and thus turns the flap A down towards the position indicated at $A^2$. The crank $B^1$, moving in the clockwise direction, transmits movement through a rod L to the casing H and thereby causes the valve $H^2$ to close the port $H^3$ thus cutting off communication between the cylinder C and both the ports $H^4$ and $H^5$. The piston $C^1$ is thus brought to rest within the cylinder C at a position corresponding to the degree of movement of the lever J, that is to say corresponding to the required angular downward movement of the flap A. Should the air flow acting on the flap A tend to turn this from the desired position of adjustment in the counterclockwise direction, the crank $B^1$ will act through the rod L so as to move the casing H to the right and thus temporarily establish communication between the ports $H^3$ and $H^4$ thereby increasing the suction within the cylinder C and restoring the flap A to the desired position. The restoration of the flap A to the desired position will again move the casing H to the left so as to cause the valve $H^2$ to close the port $H^3$.

If now the pilot wishes to lower the flap A still further he moves the lever J further in the direction of the arrow whereby the valve $H^2$ establishes communication between the ports $H^3$ and $H^4$ and the piston $C^1$ is moved further to the left until the resulting clockwise movement of the crank $B^1$ has moved the casing H so as to cause the valve $H^2$ to close the port $H^3$. With this arrangement, therefore the pilot can set the flap A at any one of several operative positions between the inoperative or fully raised position and the fully operative position indicated at $A^2$. For this purpose the lever J may be arranged to cooperate with a positive latch or gate $J^2$ whereby the lever can be set and retained in any one of several positions. Alternatively means may be provided which will frictionally resist displacement of the lever from the position in which it is set.

The servo cylinder or cylinders, and in some instances the control valve, may be housed within a wing or wings of the craft, the suction reservoir having a capacity sufficient to provide the necessary power for operating the flaps several times.

If desired means may be provided whereby movement of the lever or the like, whereby the valve is controlled by the pilot, beyond the normal range necessary for the control of the servomotor will cause movement to be mechanically transmitted to the flap or flaps directly from the lever. To this end the lever may be connected through a lost motion coupling to a mechanical system of levers or cords for operating the flap or flaps, the arrangement being such that during movement of the lever through its normal range of operation the valve is operated without movement being transmitted directly from the lever to the flaps but when the lever is moved through and beyond the said range, force will be mechanically transmitted from the lever directly through the mechanical system to the flaps.

With a view to avoiding an undesirably long travel of the valve under such conditions the valve may be connected through a lost motion device, such for example as a compression spring, to the pilot's lever.

It will be understood that the constructions above described are given by way of example only and that details may be modified. Thus, for example, instead of the servomotor being operated by the suction derived from the induction side of the engine itself, the servomotor may be operated by the suction on the intake side of a supercharger.

What I claim as my invention and desire to secure by Letters Patent is:—

In apparatus for controlling the wing flaps of aircraft, in combination, a power unit including an internal combustion engine, at least one movable wing flap, a pneumatic servo cylinder, a conduit communicating with the said servo cylinder and subjected to suction produced by the induction of the power unit, a piston within the servo cylinder, interconnecting means between the piston and the said flap, a valve controlling communication between the servo cylinder and the said suction conduit and comprising a cylinder having at least three ports, a plunger movable within said cylinder, one of which is open to the atmosphere while the other two communicate respectively with the said suction conduit and with the servo cylinder, a manually operable control device connected to the valve plunger, said plunger having free range of movement within said valve cylinder equivalent to the full range of movement of said control device and interconnecting means between the valve cylinder and the said flap, whereby movement of the flap, due to air pressure thereon from a desired position causes movement of the valve cylinder relatively to the valve plunger, thereby automatically causing operation of the servomotor in a sense tending to restore the flap to and retain it in the said desired position.

WILLIAM DENIS LEAROYD THEED.